United States Patent [19]
Tobin

[11] 3,992,258
[45] Nov. 16, 1976

[54] COATED NUCLEAR FUEL PARTICLES AND PROCESS FOR MAKING THE SAME

[75] Inventor: Joseph M. Tobin, McMurray, Pa.

[73] Assignee: Westinghouse Electric Corporation, Pittsburgh, Pa.

[22] Filed: Jan. 7, 1974

[21] Appl. No.: 431,586

[52] U.S. Cl. .................................. 176/67; 176/82; 176/91 SP; 264/.5
[51] Int. Cl.$^2$ .......................................... G21C 3/02
[58] Field of Search .................... 176/67, 91 SP, 82; 264/.5

[56] References Cited

UNITED STATES PATENTS

| | | | |
|---|---|---|---|
| 3,298,921 | 1/1967 | Bokros et al. | 176/67 |
| 3,335,063 | 8/1967 | Goeddel et al. | 176/91 SP |
| 3,361,638 | 1/1968 | Bokros et al. | 176/91 SP |
| 3,649,452 | 3/1972 | Chin et al. | 176/91 SP |
| 3,650,896 | 3/1972 | Goeddel | 176/91 SP |
| 3,798,123 | 3/1974 | Lindemer | 176/67 |

Primary Examiner—Charles T. Jordan
Attorney, Agent, or Firm—F. E. Blake

[57] ABSTRACT

An improved nuclear fuel particle comprises (a) a generally spherical low density kernel of a fissile element having a void volume of at least 40 percent of the physical volume of the kernel in order to accommodate fission gases generated during the use of the fuel particle, (b) the kernel is coated over its entire surface with an extremely thin carbon buffer layer to provide for fission recoil, and (c) thin pyrolytic carbon, (d) silicon carbide and (e) outer pyrolytic carbon layers are superimposed thereon to hermetically seal the kernel to prevent escape of generated fission gases, the pyrolytic carbon and silicon carbide layers being of sufficient strength to resist rupture of the pressure of the contained fission gases even at high reactor temperatures of the order of 1000° C–1300° C and a burn up of 50 percent or more FIMA. Such particles can be embedded in graphitic bodies to provide fuel elements having a greatly increased fuel loading per unit volume of particle and fuel element. Processes for producing such improved fuel particles are also disclosed.

5 Claims, 4 Drawing Figures

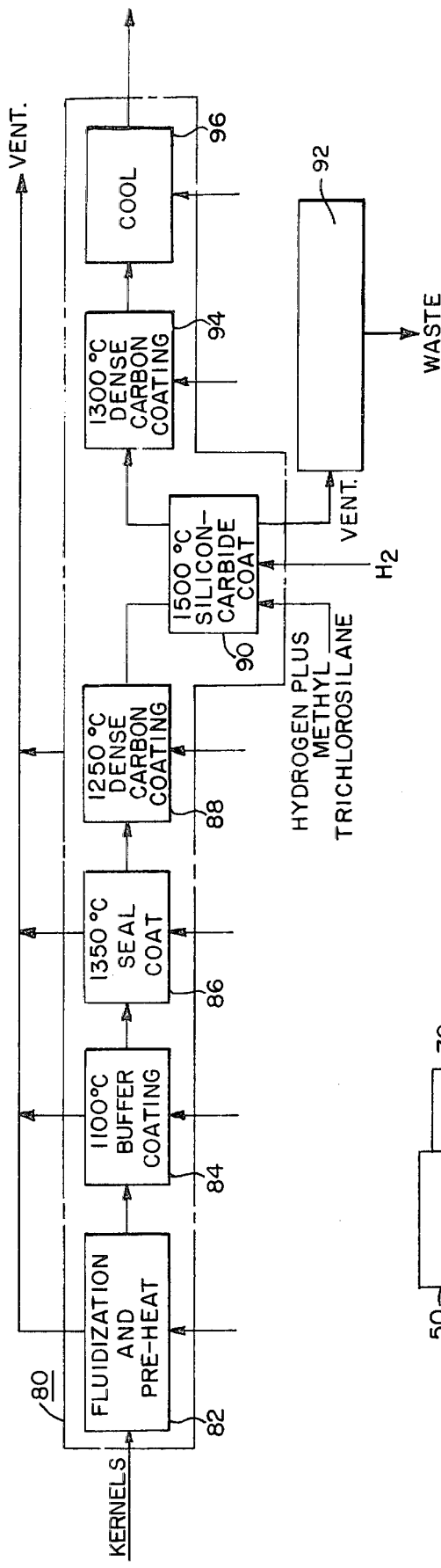
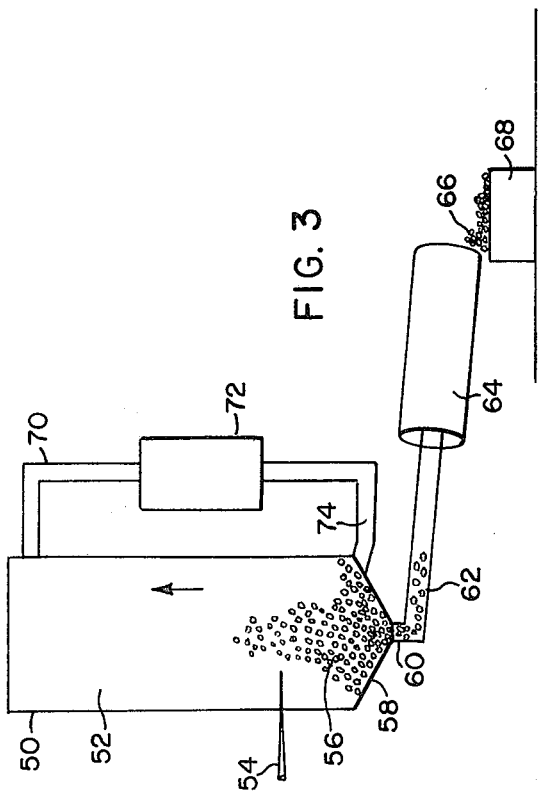
FIG. 4
FIG. 3

COATED NUCLEAR FUEL PARTICLES AND PROCESS FOR MAKING THE SAME

BACKGROUND OF THE INVENTION

1. Field of the Invention

This invention relates to nuclear fuels, and particularly to discrete nuclear fuel particles comprising essentially fissile element compounds that can be embedded in graphite or other moderator materials to provide fuel compacts or fuel elements particularly suitable for gas cooled nuclear reactors.

2. Description of the Prior Art

It has been proposed to produce individually sealed nuclear fuel particles for gas cooled reactors, which particles each comprise a microspherical kernel of a fissionable or fertile element covered completely with a hermetic carbon shell so that fission gases generated during use of the fuel particles in a nuclear reactor will be retained in the hermetic shell and not escape to the gas coolant in the reactor. As a standard it is desired that not in excess of an average one fuel particle in 10,000 rupture or leak radioactive fission gases during usage of the particles at temperatures of the order of 1000° to 1350° C and fast neutron fluences to 5–8 x $10^{21}$ n/cm$^2$ with full burn-up of 50 percent or more FIMA (fissions per initial metal atom).

To meet these requirements, the art at the present time employs substantially full density kernels of refractory compounds of fissile elements, for example, $UO_2$, $UC$, $PuO_2$ and $PuC$, with a low density porous overcoating buffer layer of a substantial thickness in the order to provide a sufficient volume of voids to accommodate at reasonable gas pressures the fission gases produced during use of the fuel particles. Thereafter, coatings of carbon and silicon carbide are applied to hermetically seal in the fission gases, the coatings being sufficiently thick and strong enough to withstand rupture under the pressures resulting from the generated fission gases at burn-ups of up to 70 percent FIMA for example. The prior art fissile kernel microspheres has a diameter of from about 100 to 200 microns, and after the buffer and all the other coatings are applied, the fuel kernel occupies only from 3 to 5.5 percent of the total fuel volume.

When embodied in fuel elements these prior art particles, of $UO_2$ for example, give a fuel loading of from about 100 to 155 mg. of U per cubic centimeter of fuel element. It would be desirable to provide fuel elements with fuel loadings of 250 mg of U/cm$^3$ and higher.

In Nuclear Technology, Vol. 16, October 1972 on pages 100 to 109 in an article entitled "The Mechanical Design of TRISO-Coated Particle Fuels for the Large HTGR" by T. D. Gulden et al., there is disclosed in Table I on page 104 fuel particles produced in accordance with the prior art wherein kernels of fissile fuel such as $UO_2$ or $UC$, of a diameter from 106 to 117 microns were first coated with carbon buffer layers of a density varying from 1.22 to 1.34 and of a thickness of from 43 to 56 microns. Two high density pyrolytic carbon layers and an intermediate silicon carbide layer were then applied. The total coating thicknesses, per kernel ranged from 98 to 123 microns, the final particle diameter being from about 304 to 363 microns. The fuel kernel comprised only from 3.1 percent to 4.3 percent of the total volume of the six batches of coated fuel particles in Table 1 of this article. In these examples, the volume of the kernel itself to that of the volume of the kernel plus its buffer coating comprised from about 16 percent to 19 percent. The remainder of this latter volume is occupied by the buffer coating necessary to provide space for the expected fission gases. Even so, in Batches 4413-7 and 3516-39 some 3.7 percent and 4 percent of their particles exhibited failed silicon carbide coatings.

What appears to be a desirable design of fuel particle whose characteristics were analyzed for stress characteristics is that set forth in FIG. 2 of this article. The kernel had a diameter of 200 microns, the buffer layer was 85 microns thick and of a density of 1.15 g/cm$^3$, the first dense pyrolytic carbon coating was 25 microns thick, the silicon carbide layer was 25 microns thick and the outer dense pyrolytic carbon coating was 35 microns thick. The kernel of fissile material comprised 15.8 percent of the volume of the buffer coating enclosed sphere, and only 5.1 percent of the total particle volume.

In the Proceedings of the Fourth International Conference held at Geneva 6–16 Sept. 1971 on "Peaceful Uses of Atomic Energy," in volume 4, appear a number of articles describing fuel particle manufacturing and use. On pages 391 to 402 of Vol. 4 a paper by Schumaker et al. entitled "Preparation of Uranium-Plutonium Carbide Fuel Particles," describes the preparation of microspheres of plutonium-uranium carbides.

On pages 415 to 432 of Vol. 4, in a paper entitled "Fuel Elements for High Temperature Reactors" by Aumuller et al., there are described fuel particles wherein buffer layers of from 50 to 70 microns in thickness are applied to kernels. The kernel diameters for the "feed" fuels is from 150 to 250 microns, because as stated on page 418, this size was necessary "to reduce the internal fission gas pressure at a given thickness of the porous layer coating." For breeding fuels, in which the kernels comprised a fertile material as well as some fissionable element, kernel diameters of 400 to 600 microns were feasible.

It is assumed that the 150 to 250 micron feed fuel kernels in this paper had a 50 micron thick buffer or porous layer applied plus either single 120 micron layer or the three 50-30-35 micron thick high density carbon layer, silicon carbide layer and high density carbon layer applied as in Table III, on page 421. In any case, the volume of the kernel is from 3 percent to 7.6 percent of the final feed fuel particle.

In the paper on pages 433 to 447 of Volume 4, "Utilization of the Thorium Cycle in the HTGR" by H. B. Stewart et al., the making and structure of fissile fuel particles is described. In general, these comprise a microspheric kernel of nuclear fuel of 200 microns in diameter with an applied total coating 130 microns in thickness, with the diameter of the final fuel particle being 460 microns — and the kernel comprises 8.2 percent of the volume of the fuel particle. Because of the higher proportion of non-fissile material in the fertile fuel particles, the total metal loading per cubic centimeter of a mixture of both fertile and fissile fuel particles is a relatively high 0.7 to 0.8 g/cm$^3$.

In the paper entitled "Development of a Manufacturing Route for Fuel for the Mark III gas-cooled Reactor (HTR)" by R. W. M. D'Eye and T. J. Heal appearing on pages 449 to 458 of Volume 4, there is set forth the desired standard of less than 2 defective particles in 10,000 and the authors state that "ideally not exceed 1 in $10^4$". This paper describes processes for producing kernels by tumbling $UO_2$ along with an additive in a drum so as to produce microspherical kernels of a diameter of some 200 microns. These are then coated.

SUMMARY OF THE INVENTION

In accordance with this invention, there are produced novel sealed fuel particles comprising a relatively large microspherical kernel of low density of a refractory compound of a fissionable element, at least 40 percent of the kernel volume comprising voids capable of accommodating fission gases generated during use of the fuel particles in a nuclear reactor and hermetic sealing layers disposed about the kernel, thereby providing a higher proportion of fissile metal per unit volume of particle than by prior art practices. The thick buffer layer, necessarily employed in prior art fuel particles in combination with relatively small high density kernels in order to provide void space to accommodate the generated fission gases, in this invention, is greatly reduced to a minimum thickness to provide essentially only for fission recoil. Even with hermetic sealing layers applied thereafter, the fuel particle of this invention provides a greatly increased percentage of fissionable metal per unit volume. The fuel particles of this invention will meet all requirements of strength, reliability and resistance to rupture by generated fission gases.

THE DRAWINGS

FIG. 3 is a schematic view of apparatus for preparing kernel microspheres; and FIG. 4 is a flow diagram of a process for the coated fuel particles.

DETAILED DESCRIPTION OF THE INVENTION

The present invention prepares a more efficient fuel particle comprising (a) a relatively large, low density microsphere of a refractory fissile element compound having at least 40 percent of its volume of voids which can accommodate fission gases that may be generated during use of the particle in a nuclear reactor; (b) an extremely thin fission recoil or buffer layer of a thickness of from about 10 to 20 microns applied to cover completely the surface of the kernel, the outer surface of this buffer layer being sealed, any voids in this layer taking up only a small portion of fission gases; and (c) two hermetic pyrolytic carbon coatings and an intermediate silicon carbide layer covering the entire surface of the buffer coating, and being of thickness to withstand rupture by generated fission gases.

Figure 1:
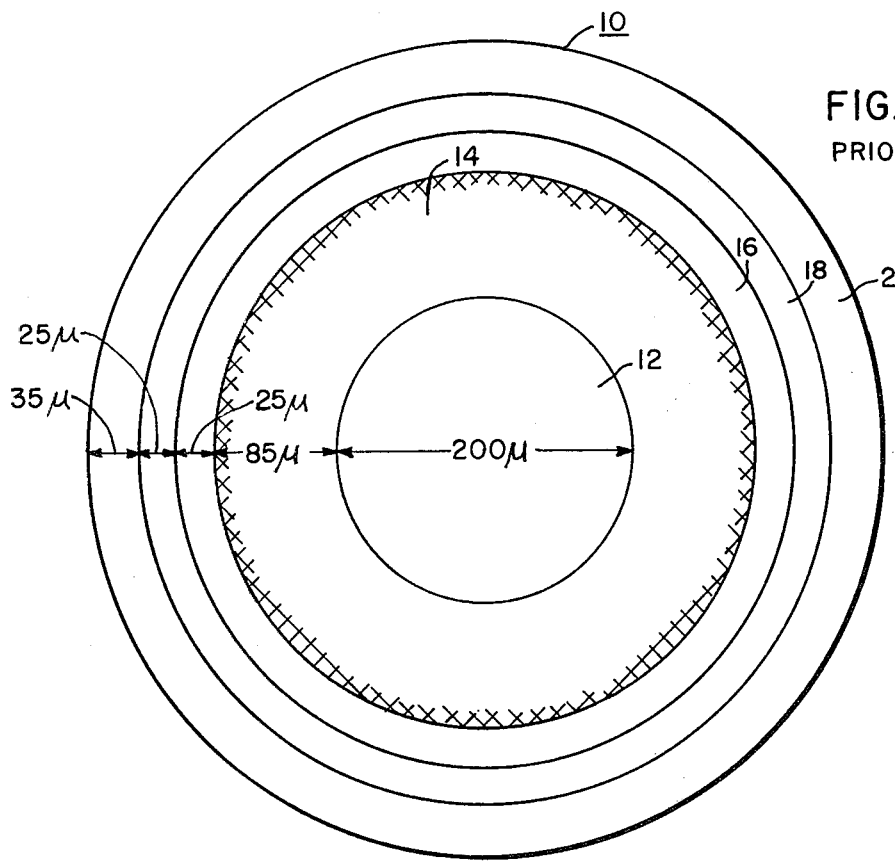
FIG. 1 is a cross-section of a typical prior art fuel particle.

Referring to FIG. 1, there is shown in cross section a fuel particle 10 made according to prior art practice wherein the microspherical fissile kernel 12 of $UO_2$, for example, is 200 microns in diameter, applied thereon is a low density carbon buffer layer 14 of a thickness of 85 microns, and a hermetic overcoating comprising a first dense pyrolytic carbon layer 16 which is 25 microns thick, silicon carbide layer 18 which is 25 microns thick and an outer dense pyrolytic carbon layer 20 which is 35 microns thick. The diameter of the particle 10 is 540 microns. The volume of the kernel is 5.1 percent of the total volume of the particle. Usually the kernel itself is from 90 to 95 percent of the ultimate theoretical density of the material comprising it. The buffer layer has a density of 1.15 $gr/cm^3$ while fully dense carbon layer has a density of 1.95. Therefore about 40 percent of the buffer layer comprises voids or empty spaces.

Figure 2:
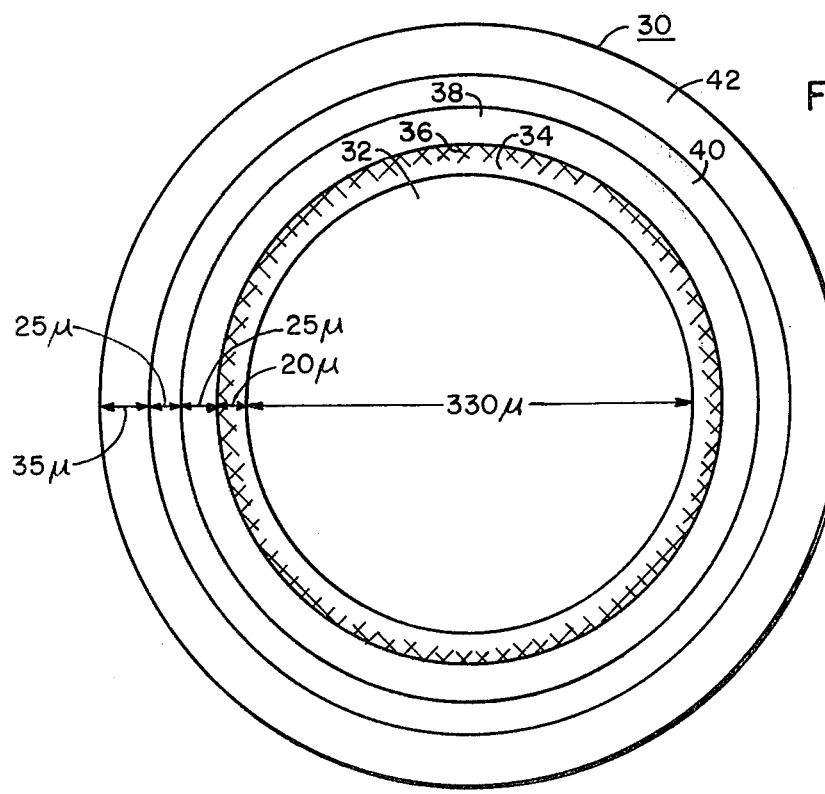
FIG. 2 is a cross section fuel particle made in accordance with the present invention

Referring to FIG. 2 of the drawings, there is shown a diametrical cross-section of a fuel particle 30 made in accordance with this invention. The fuel particle has an outside diameter of 540 microns. It comprises a spherical kernel 32 of a refractory fissile metal compound such as $UO_2$, at from 35 percent to 55 percent of theoretical density. The kernel 32 is 330 microns in diameter. A thin recoil and buffer layer 34 of a thickness of some 20 microns and of low density (1.15 $gr/cm^3$) carbon is applied over the surface of kernel 32. The outer surface 36 of the layer 34 is sealed to a depth of a micron or two. A dense (1.95 $gr/cm^3$) layer 38 of pyrolytic carbon of a thickness of 25 microns is applied to cover the surface of layer 34–36. A silicon carbide layer 40 of a thickness of 25 microns is then applied. A final dense pyrolytic carbon layer 42 of a thickness of 35 microns completes the particle. Layers 38-40-42 are hermetic and prevent escape of fission gases generated in kernel 32 and are of sufficient strength to resist rupture even at high burn-ups of 70–75 percent FIMA.

The quantity of fissile element in kernel 32 of fuel particle 30 is almost twice that in kernel 12 of fuel particle 10, when the kernel 12 is 90 percent of theoretical density, and almost 1.75 times that in kernel 12 if the latter is at theoretical density. Consequently, in a nuclear reactor for the same number of particles, fuel particles 30 would have available for reaction from 1.75 to 2 times the amount of the fissile material provided by fuel particles 10.

The FIG. 2 particle will provide a proportionately larger volume of voids or spaces in kernel 32 to accomodate fission gases generated in the particle during nuclear use, as does the FIG. 1 particle for equal burn-up. The pressure of the fission gases for, say 70 percent burn-up, will be well below the rupture strength of the outer coatings.

In preparing fuel elements proper from the nuclear fuel particles of this invention, the fuel particles may be coated or admixed with a graphite-resin mixture and a weighed quantity of the so-coated particles are place within a die and hot pressed to form compacts. The compacts are then heated to a high temperature in a non-oxidizing atmosphere until the resin binder decomposes and is converted to a carbonaceous residue while the gaseous reaction products are out-gassed by heating the compacts (a partial vacuum may be maintained) to a temperature slightly higher than they will be subjected to in a nuclear reactor. The carbonized compacts, which may be designated as fuel blocks, are stacked together to form a high temperature fuel element. These blocks may include apertures for introduction of control rods while longitudinal holes extending from one end of the fuel element to the other are present to permit the flow of a gas such for example as helium or argon, to absorb heat from the fuel elements while in a nuclear reactor. The gases passing through these latter holes cool the fuel element so that the temperature thereof may be maintained in the range of from 1250° to 1350° C in operation.

During operation of the elements in a nuclear reactor the kernel material comprising the fissile fuel element will heat up to high temperatures and gradually be transported to the inside surface of the buffer or recoil layer. Ultimately, most of the fissile material, for example uranium dioxide, forms a hollow spherical shell within each fuel particle. This is highly advantageous since the fissile material will be in direct physical contact with the buffer or recoil layer and consequently thermal conductivity is at a maximum. Thus for a given rate of reaction in the fuel the temperatures of the fuel particles will be lower than in other fuel particles where such migration of the fissile material is not feasible.

The fuel elements produced using the nuclear fuel particles of the present invention may comprise 40 percent by volume thereof of the nuclear fuel particles. The channels for flow of helium or coolant gas will comprise about 25 percent by volume. Only a small fraction of the volume of the fuel element will be necessary for control rods. In such proportions the fuel element comprising particles as shown in FIG. 1 of the drawing will comprise approximately 155 milligrams of the fuel element (uranium) per cubic centimeter. The fuel elements employing the nuclear particles of the present invention as shown in FIG. 2 will have from 270 to 400 milligrams of fissionable metal per cubic centimeter of the element.

In order to produce the fuel elements of the present invention as shown in FIG. 2, the following process is exemplary. Suitably enriched uranium compound, for example uranium dioxide, is dissolved in a nitric— 1 percent hydrofluoric acid mixture to make a uranyl nitrate solution. This solution is electrically reduced by passing an electrical current between platinum electrodes between which the solution passes to produce tetravalent uranium nitrate green solution. Dialysis and electrolysis are employed in accordance with well known procedures to produce a urania ($UO_2$) sol liquid, for example U.S. Pat. Nos. 3,691,087, 3,375,203 and 3,514,412 disclose the making of sols and fuel particles, and reference is made thereto.

Referring to FIG. 3 there is illustrated generally apparatus for converting the urania sol to nuclear kernel microspheres of the desired low density within a column 50 of a length of, for example 16 feet, containing a body 52 of anhydrous n-hexanol. At the lower end of the column 50, hypodermic needle type injectors 54 are employed to introduce the urania sol liquid into the n-hexanol 52 as liquid microspherical drops 56. The location of the injectors 54 is not critical and may be elsewhere in column 50. The upward flow of the n-hexanol 52 is controlled so that as it streams past the projectors 54, it tends to carry them away and separates the gel microsphere droplets. The anhydrous n-hexanol extracts the water from the urania microspheres to produce nearly water free urania gel microspheres which shrink slightly in the process and thereby their density becomes slightly greater than that of the n-hexanol so that the urania microspheres sink slowly and collect at the bottom of the column as a mass 56 that enters the conical funnel-shaped region 58. A controlled stream 60 of the microspheres passes into a pipe 62 and is conveyed to a rotary drier 64 which is heated to a temperature of 100° C whereby to extract more water from the urania gel microspheres. By control of the temperatures and times in the drier, the urania microsphere density may be maintained as low as 35 percent of theoretical density. U.S. Pat. No. 3,514,412 also discloses the making of porous microspheres and reference should be had thereto for related techniques. The dried particles 66 flowing out of the end of the drier are collected in a suitable receptacle 68 for subsequent treatment.

The hexanol flowing upwardly in column 50 acquires a small amount of water in the process of dehydrating the sol-gel particles and at the upper end enters into a pipe 70 leading to a still 72 where the water and n-hexanol are separated by distillation. The water fraction is discarded while the dry n-hexanol is pumped into pipe 74 back to the bottom of the still 50 for reuse.

It will be understood that numerous other dehydrating organic liquids such, for example, as 2-ethyl hexanol, as well as those in U.S. Pat. No. 3,331,785, may be employed.

The dried low density, sol-gel $UO_2$ microspheres are now sufficiently strong that they may be coated and encapsulated with carbon and silicon carbide. Referring to FIG. 4 of the drawing there is illustrated schematically a suitable apparatus for applying the desired coatings. A significant step in the process which must be carefully controlled is the application of the thin carbon buffer or fission recoil coating on the low density microsphere kernels. The kernels have a remarkable tendency to densify and shrink in size if overheated and therefore the first or buffer coating must be applied rapidly at relatively low temperatures. Thereafter the subsequent coatings can be applied more slowly and at higher temperatures. The apparatus 80 in FIG. 4 comprises a suitable enclosure within which are present either separate treating units or if desired, one unit in which different coatings are applied serially as the microsphere pass therethrough. At the first step at 82 the microspheres are introduced and fluidized and preheated by passing thereto a stream of a heated gas such as argon. Then the heated microspheres are passed to a second fluidized bed apparatus 84 which is maintained at a temperature range of from about 1000° C to about 1100° C and an atmosphere comprising acetylene gas, either pure or admixed with up to 25 percent of its volume of an inert gas such as argon. In a period of time of from ½ to 1 minute the acetylene gas coming in contact with the hot microspheres will decompose to deposit a low density carbon coating corresponding to 34 in FIG. 2, of a thickness of from 10 to 20 microns. The density of this buffer or fission recoil coating is from 1.15 to 1.2 grams/cc.

It is desirable to seal the outer surface of the applied buffer coating on the microspheres. This is accomplished by passing the coated microspheres to a fluidized bed furnace 86 through which passes a gas stream comprising a low proportion of hydrocarbons, such for example as 20 percent propylene and 80 percent argon, with the bed temperatures being kept at approximately 1350° C. In 1 minute the outer surface of the buffer coating is densified and filled with additional carbon without appreciably increasing its thickness.

Thereafter the coated and sealed microspheres are passed to another fluidized bed furnace 88 in which the microspheres are heated to a temperature of 1250° C for a period of 3 minutes while suspended in an atmosphere comprising propylene gas. At these temperatures, the propylene gas decomposes and deposits on the microspheres a thin layer of pyrolytic carbon of a density of from 1.45 to about 1.9 grams per cc. to a thickness of approximately 25 microns. This coating comprises the inner isotropic coating 38.

In order to apply a silicon carbide layer the microspheres are passed to a fluidized bed deposition chamber 90 where they are heated to a temperature of 1500° C while surrounded by and suspended in a gas mixture comprising a gaseous silane and hydrogen. The atmosphere may comprise, for example, 90 percent pure hydrogen plus a stream comprising 10 percent of hydrogen previously bubbled through liquid methyl trichlorosilane. It requires approximately 5 hours in chamber 90 to deposit a 25 micron thick coating 40 of silicon carbide on the microspheres. At the temperatures of the microspheres the hydrogen reduces the methyl trichlorosilane to hydrogen chloride and silicon carbide which latter deposits on the microspheres. The density of the silicon carbide is approximately 3.2 gr./cc. The exhaust gases from chamber 90 are vented through an alkali liquid gas scrubber and filter washer device 92 which produces relatively innocuous wastes.

The silicon carbide coated microspheres then pass to the chamber 94 where they are again fluidized at a temperature of about 1300° C while 100 percent propylene gas is passed therethrough for a period of time of approximately 3 minutes. At these temperatures and conditions, a high density isotropic pyrolytic carbon coating 42 is deposited on the microspheres to a thickness of about 35 microns. The density of this coating is from about 1.8 to 1.9 gr/cc. Finally the hot coated microsphere particles are passed into a terminal fluidized bed 96 where they are slowly cooled to room temperature, in an inert gas of, for example, argon. The cooled carbon coated microspheres of an average diameter of 540 microns, are then withdrawn and processed into fuel elements.

While the sol-gel process has been indicated as suitable for producing low density urania microspheres, a similar process may be employed for mixtures of urania and plutonium oxides. Alternatively, the low density urania microspheres 66 may be impregnated with plutonium solution as set forth in U.S. Pat No. 3,514,412.

The low density microspheres may be also prepared in the form of uranium oxide and/or plutonium oxide by admixing the oxides with fine carbon particles and tumbling the powder with an agglomerating additive in a drum. The process results in spheres which are closely spherical and of a suitable density. The spheres so produced may be suitably classified in order to remove any non-spherical particles and dust. The green spheres so produced are then heat treated at a temperature high enough to cause the carbon to react with the oxides to produce carbon monoxide gas and to form uranium carbide. By using $U_3O_8$ plus excess of carbon over that required to react with the oxygen to form carbon monoxide and to react with the uranium to produce uranium carbide, there result highly porous sintered microspheres of uranium carbide. The temperature can be controlled to produce a carbide microsphere product having from 35 percent to 50 percent density. The resulting microspheres may be coated by following the process of FIG. 4 as disclosed herein.

The process of the present invention is particularly adapted for treating refractory compounds of the fissile elements such as uranium, plutonium and thorium. The fissle isotopes, for example $U_{235}$ and $U_{233}$, may comprise a high percentage of the kernel of the fuel particle. Similarly, small amounts of non-fissile but fertile materials such as $U_{238}$ and thorium may be admixed with the fissile material.

I claim as my invention:

1. A nuclear fuel particle including a relatively low density kernel of nuclear fuel which results in a fuel element employing such particles which has a substantially higher fissile fuel loading per unit volume of the element which is on the order of 270 to 400 mg of fissionable material per cubic centimeter of the element where such element comprises 40 percent by volume of fuel particles and 25 percent by volume of coolant channel, said particle comprising a kernel comprising a refractory compound of a fissile element, said kernel having a void volume of at least 40 percent of the physical volume of the kernel in order to accommodate fission gases generated during use of the fuel particle, said kernel comprising approximately 20 percent of the volume of the fuel particle a first extremely thin coating of a carbonaceous buffer material covering the entire surface of the kernel, a thin second coating of pyrolytic carbon completely covering the first coating, a thin silicon carbide coating over the second thin coating and completely covering it, and a thin outer pyrolytic carbon coating applied over and completely covering the silicon carbide coating, the this coating being sufficiently gas tight to prevent escape of fission gases generated in the kernel and having a combined strength to resist rupture by the pressure of the fission gases generated during use of the fuel particles in a nuclear generator, so that even at high reactor temperatures of the order of 1000° C and a burn-up of 50 percent or more FIMA, only a small percentge of the fuel particles exhibit failure of the silicon carbide coatings.

2. The fuel particle of claim 1, wherein the first thin carbonaceous coating comprises a layer of porous pyrolytic carbon of a thickness of from about 10 to 20 microns with a thin sealing carbonaceous surface thereon.

3. The fuel particle of claim 1 wherein the kernel is generally spherical with a diameter of from about 200 to 400 microns in diameter, and the complete fuel particle is generally spherical and of a diameter of from about 400 to 600 microns.

4. The fuel particle of claim 1 wherein the kernel comprises a compound selected from the group consisting of oxide, carbide and a mixture of oxide and carbide compounds where the anion of said compound includes an element selected from the group consisting of uranium, plutonium and thorium.

5. A nuclear fuel particle including a relatively low density kernel of nuclear fuel which results in a fuel element employing such particles which has a substantially higher fissile fuel loading per unit volume of the element which is on the order of 270 to 400 mg of fissionable material per cubic centimeter of the element where such element comprises 40 percent by volume of fuel particles and 25 percent by volume of coolant channel, said particles comprising a generally spherical kernel selected from the group consisting of oxide and carbide compounds, the anion of said compound comprising a fissile element selected from at least one of the group consisting of uranium, plutonium and thorium, and said kernel having a void volume of at least 40 percent of the physical volume of the kernel in order to accommodate fission gases generated during use of the fuel particle, the diameter of the kernel being between about 200 and 400 microns, a first coating of a thickness of from about 10 to 20 microns covering the entire surface of the kernel, the outer surface of said first coating being sealed, the first coating comprising porous carbon except for the outer sealed surface in order to function as a buffer and to accommodate fission recoil, a dense, hermetic second coating of isotropic pyrolytic carbon of a thickness of from 20 to 35 microns covering the entire surface of said first coating, a strong, dense third coating of silicon carbide of a thickness of from 20 to 35 microns covering the entire surface of said second coating, and a dense, hermetic fourth coating of isotropic pyrolytic carbon of a thickness of from 25 to 45 microns covering the entire surface of the silicon carbide, coating, the second, third and fourth coatings being sufficiently gas tight to prevent significant escape of fission gases generated in the kernel and being of a strength and so proportional to the diameter of the kernel to resist rupture of the pressure of the fission gases generated during use of the fuel particles in a nuclear generator, so that even after use at high reactor temperatures of the order of 1000° C and a burn-up of 50 percent or more FIMA only a very small percentage of the fuel particles exhibit failure of the silicon carbide coating.

* * * * *